United States Patent
Chou

(10) Patent No.: US 6,735,584 B1
(45) Date of Patent: May 11, 2004

(54) ACCESSING A DATABASE USING USER-DEFINED ATTRIBUTES

(75) Inventor: Peilin Chou, Taipei (TW)

(73) Assignee: Bridgewell, Inc., Taipei (TW)

( * ) Notice: Subject to any disclaimer, the term of this patent is extended or adjusted under 35 U.S.C. 154(b) by 549 days.

(21) Appl. No.: 09/316,436

(22) Filed: May 21, 1999

(30) Foreign Application Priority Data

May 29, 1998 (TW) ........................................ 87108378 A

(51) Int. Cl.[7] ................................................ G06F 17/30
(52) U.S. Cl. .......................................... 707/3; 707/104.1
(58) Field of Search ................................ 707/104, 102, 707/103 R, 1, 205, 530, 101, 103; 717/2, 5; 711/173; 709/224

(56) References Cited

U.S. PATENT DOCUMENTS

| | | | | |
|---|---|---|---|---|
| 4,189,781 A | * | 2/1980 | Douglas ..................... | 711/173 |
| 5,181,162 A | * | 1/1993 | Smith et al. ................ | 707/530 |
| 5,815,717 A | * | 9/1998 | Stack ........................... | 717/5 |
| 5,987,472 A | * | 11/1999 | Serafin ....................... | 707/104 |
| 5,991,776 A | * | 11/1999 | Bennett et al. ............. | 707/205 |
| 6,047,289 A | * | 4/2000 | Thorne et al. .............. | 707/10 |
| 6,112,207 A | * | 8/2000 | Nori et al. ................... | 707/101 |
| 6,112,210 A | * | 8/2000 | Nori et al. ................... | 707/103 |
| 6,189,012 B1 | * | 2/2001 | Mital et al. ................. | 707/103 |
| 6,192,373 B1 | * | 2/2001 | Haegele ...................... | 707/104 |

* cited by examiner

Primary Examiner—John Breene
Assistant Examiner—Mohammad Ali
(74) Attorney, Agent, or Firm—Douglas L. Weller

(57) ABSTRACT

A dynamic database index and management system essentially involving a multiple of user-defined data attributes used to depict the nature and type of stored data. The user defines attributes, defines subordinate relationships between attributes and determines which attributes are assigned to which data lots. Attributes may then be used for retrieval of the data.

3 Claims, 5 Drawing Sheets

| Attribute No | Attribute Name | Relative Attribute No |
|---|---|---|
| 0001 | Earth | |
| 0002 | Asia | 0001 |
| 0003 | America | 0001 |
| 0004 | Taiwan | 0002 |
| 0005 | Taichung | 0004 |
| 0006 | History | |
| 0007 | Canada | 0003 |

11  12  13  10

| Attribute No | Attribute Name | Relative Attribute No |
|---|---|---|
| 0001 | Earth | 0001 |
| 0002 | Asia | 0001 |
| 0003 | America | 0002 |
| 0004 | Taiwan | 0004 |
| 0005 | Taichung | |
| 0006 | History | |
| 0007 | Canada | 0003 |

FIGURE 1

| File No | Location | Relative Property No |
|---|---|---|
| A000025 | C:\Document\Article.doc | 0006 |
| A000025 | C:\Document\Article.doc | 0005 |
| A000025 | C:\Document\Article.doc | 0007 |
| A000030 | D:\Person\Report.xls | 0004 |
| A000035 | E:\Readme.txt | 0005 |

FIGURE 2

| File No | Location | Relative Property No |
|---|---|---|
| A000025 | C:\Document\Article.doc | 0006 |
| A000025 | C:\Document\Article.doc | 0005 |
| A000025 | C:\Document\Article.doc | 0007 |
| A000030 | D:\Person\Report.xls | 0004 |
| A000030 | D:\Person\Report.xls | 0006 |
| A000035 | E:\Readme.txt | 0005 |

FIGURE 3

| File No | Location | Relative Property No |
|---|---|---|
| A0000025 | C:\Document\Article.doc | 0005 |
| A0000035 | E:\Readme.txt | 0005 |

FIGURE 4

| File No | location | Relative Property No |
|---|---|---|
| A000025 | C:\Document\Article.doc | 0005 |
| A000025 | C:\Document\Article.doc | 0007 |
| A000035 | E:\Readme.txt | 0005 |

FIGURE 5

ACCESSING A DATABASE USING USER-DEFINED ATTRIBUTES

BACKGROUND OF THE INVENTION

1. Field of the Invention

The present invention relates to databases and pertains particularly to accessing data from a database using user-defined attributes which are familiar to a user and easily memorized.

2. Description of the Prior Art

The collection and use of information is important both for individuals and corporate entities. This is particularly true for certain professions, such as news agencies and publishing companies. In these professions, the collection and management of data is essential.

In early data management systems, data was collected and preserved. Data, when needed, was searched out one article at a time. Such a traditional data management lacks structure, and is not sufficient for modern society which values efficiency and speed.

In more recent years, the use of computers has greatly increased the efficiency of data management. Data management by computer is generally divided into two systems. In one system, data is sorted by index. In the other system, data is sorted using multiple indexes similar to the use of a bibliographical card index.

When sorting by index, a subjective judgment of data is made according to the existing sorting criteria. Based on this subjective judgement, the data is indexed and stored into a corresponding file. When a particular lot of data is desired, a search is performed by index in an attempt to locate the appropriate data.

One drawback of a single index system is that sorting is done manually in reliance upon the subjective judgment of an administrator. Data supposed to be classified under a first category might be misplaced in a second category simply because the administrator failed to recognize the nature of the data. Since any lot of data is generally put under only one particular category only, the lot of data is practically missing if put under another category by mistake. Therefore, it is easy in a single index for data to become lost or difficult to retrieve.

In multiple index systems, multiple indexes are used. For example, separate columns can be used to allow sorting by author, log-in date, log-in publication, topic or serial number. The data can then be retrieved using an index for any column.

However there are also deficiencies with multiple index systems. For example, for any particular lot of data any and all specific columns can fail to satisfy the needs for organization of data. For instance, it may still be difficult to define and classify data used by a news agency or a publishing company. For example, if there are seven co-authors in a given article and the specific column used to index authors allows the entry of at most three authors, then only three of seven co-authors can be used to index the article. The remaining four authors would have to be abandoned in the entry. A later search for the works of these four authors would not turn up this article. Furthermore, the selection of which authors to include in the entry and which to drop requires a subjective judgment.

Key words can be used to index data. For example, to index a target article, keywords can be used such as "Politics", "Related to Crossing the Straits", or "Straits Exchange Foundation". These keywords can be stored with the document or the database system can perform a full text index through all documents in the database searching for a keyword. However, use of keywords for searching lacks accuracy since articles may contain searched key words, but the key words may have different meanings as used in different articles. Thus searching by key word is often not worth the effort.

SUMMARY OF THE INVENTION

Whereas the existing data index and management methods for files deficient both in terms of efficiency and speed, the primary objective of the present invention is to provide a dynamic methodology for data base index and management by attribute. In the preferred embodiment of the present invention a multiple of columns are provided for a user to actively define the data into various attributes for fast and precise search of target data by the fact that the user is familiar with those user-defined attributes which at the same time can be easily memorized by the user.

Another objective of the present invention is to provide a dynamic methodology for data base index and management by attribute. The configuration of the database is not predetermined. Instead the data itself is used as a starting point to create a data characteristics oriented configuration of the management system. The resulting database system is not limited to using a set number of columns to define identification characteristics. Instead, at the reference, attributes are created and fit into an attribute structure at the discretion of the users. Multiple attributes may be associated with any data lot. What is meant by a data lot is any grouping of data such as a document or data file.

Any word or group of words deemed by a user to have meaning can be formed by a user. A created attribute is then placed in an appropriate location in an existing attribute structure. Multiple attributes can be assigned to a data lot. Any or these attributes or logical combination of these attributes can then be used to access the data lot. Since a particular document may be given various attributes, this allows for an easy search using such logical operations as intersection or union of attributes.

A further objective of the present invention is to include an attribute logging segment and a file logging segment. Within the attribute logging segment is provided for the storage of attributes defined by the user on various documents. Each attribute is respectively designated with items of "Description of Attribute", "Attribute No." and "Relevant Attribute No." for the logging. The "Description of Attribute" is actively entered by the user, the "Attribute Number" which may be in the form of sequential number, is automatically generated by a management unit of attribute logging in the attribute logging segment for each logging attribute and the "Relevant Attribute No." also actively entered by the user relates to the number of any other attribute related to that of the document, and is made an integral part of those attributes to the document in question.

The file logging segment is provided to log in and store those document data with defined attributes, and file number as well as the address of placement are given to each lot of data together with its attribute number. The file number may be given the same as the attribute number for identification purpose only provided it does not repeat itself. The method described above achieves a structured data and a more user-friendly environment.

Another objective yet of the present invention is the address for placement of the file logging segment may be marked by the description of a disk unit, route and file name while the methods of index and management described above are run by a computer.

In order to satisfy the above objectives the access of data is facilitated using user-defined attributes. Attributes are stored in a first logging segment. Entries for the attributes contain information which indicate subordinate relationships between attributes. The subordinate relationships creating an attribute structure. When a user stores a data lot, the user is allowed to specify one or more attributes to be linked to the data lot. Entries which show links from data lots to attributes are stored in a second logging segment.

In the preferred embodiment, each entry in the first logging segment includes an identification of an attribute and an identification of any subordinating attribute. Specifically, each entry in the first logging segment includes an attribute number, an attribute name and a relative attribute number. The relative attribute number is an attribute number for a subordinating attribute. Likewise, each entry in the second logging segment includes an identification of a data lot and an identification of an associated attribute. Particularly, each entry in the second logging segment includes a file number, a file location and a relative attribute number. The relative attribute number specifies an associated attribute.

A user can hierarchically traverse the attributes stored in the second logging segment in order to specify an existing attribute. Alternatively, the user can perform a text search to locate an attribute within the second logging segment.

In the preferred embodiment, the user can also define a new attribute. The user supplies a name for the new attribute. The user can also specify any existing attribute to which the new attribute is subordinate. An entry for the new attribute is then placed in the first logging segment.

There are various ways the user can use the attributes to access information. For example, in response to the user specifying an attribute, data lots are listed which specify the attribute. Alternatively the user can hierarchically traverse the attributes stored in the second logging segment in order to specify the attribute. Alternatively, in response to the user specifying a logic combination of attributes, data lots are listed which satisfy the logic combination of attributes. The logical combination of attributes is, for example, an intersection of two or more attributes, or a union of two or more attributes.

The present invention allows dynamic definition of attributes unrestricted by fixed columns. In the preferred embodiment of the present invention all attribute items used to define a document are chosen by the user. The principles of the present invention may be applied in the management of data from various fields because the attributes are dynamically defined. This eliminates the problem of a fixed structure (such as columns) no allowing sufficient flexibility in defining attributes. Additionally, since attributes of the document are defined subjectively, by the user, attributes can be precisely specified in the course of index to allow fast location of documents.

The present invention allows access to data in various forms. A data lot can be composed of text, image, sound or any other form of information. The attribute management system herein disclosed allows simplicity of cataloging and retrieving even data, such as imaging data, for which traditional searching techniques, such as full text search, are not available. Since the attribute management system is an external cataloging system, this facilitates the storage and retrieval of all sorts of information. Storing and retrieving is done without affecting the integrity of the source document in any way.

Since present invention facilitates attribute definition external to a document, the system supports existing methods to catalog data, such as is involved in a folder system, but allows data to be accessed from several attributes, without requiring duplicate copies of a file. For example, the user may separately create two attributes for a file. The first attribute is based on the USA National Library Sorting Criteria. The second attribute is based on ROC National Library Sorting Criteria. If both attributes are assigned to a single file, then the file can be accessed using either system. However, no duplicate of the data in the file is necessary. All that is necessary is to assign both attributes to the file. Therefore, the present invention allows a number of sorting systems to become compatible among one another with unrestricted expansion and modification at the discretion of the user.

Attributes of different types can be specified by a user for better retrieval of data. For example, one type of attribute assigned to a file can be similar to a keyword. The keyword could be, for example, a person, an event, a time, a place or an object. The vocabulary of the keyword attribute expresses clear and independent significant. In addition, the user can assign to a file an attribute which specifies a category or sorting code. This allows the file to be accessed based on a particular sorting system. Such a simultaneous use of attributes of different types may give a very integral and faithful definition to data contained in a document. However, the two types of attributes allow for versatile access of data. The present invention allows fully utilization of attributes of both types through the dynamic definition of attributes allowed by the preferred embodiment in the present invention.

BRIEF DESCRIPTION OF THE DRAWINGS

FIG. 1 is a schematic view of an attribute logging segment of the present invention.

FIG. 2 is a schematic view of a file logging segment of the present invention.

FIG. 3 is a schematic view of an additional file logging of the present invention.

FIG. 4 is a schematic view of an index file logging of the present invention.

FIG. 5 is a schematic view of another index file logging of the present invention.

DETAILED DESCRIPTION OF THE INVENTION

The preferred embodiment of the present invention allows for the use of dynamic database indices and the management of data based on attributes.

When storing a data lot (for example, a data file), a user assigns one or more attributes to the data lot. A search is then made among already defined attributes for relevant attributes to the lot of data to be stored. The search is done by text matching or utilizing established subordinate relationships between the attribute and other attributes. The lot of data is stored at a specified location. The file location and relevant attribute number, as correlated to already defined attributes, is also stored.

When defining attributes, a user is not limited to any fixed column length or a certain standardized format. On the contrary, any message that the user determines has a reference value may be used as an attribute. Thus an attribute can be defined, for example, as a word, a symbol, a specific term, a number, a person's name, a name of a location or an organization.

For example, for an article on the status quo of the external trade between Taiwan and Canada in 1991, a user can assign any or all of the following as attributes for the article: "1990", "Taiwan", "Canada", "Trade", "Agricultural Crops", and "Surplus".

Since the attributes are proposed by the user, the chosen attributes best suit the viewpoints of the user. Therefore, when the user is retrieving the data, the attribute can be accurately specified for a fast search of the data required.

Furthermore, since attributes are defined by the user, there are no built in size or number limitations. This eliminates the problem described above where in a traditional index system only a limited number of items (e.g., authors) may be listed because of a limited number of items being allowed for a particular column.

Since a user is able to define new attributes at will, the number of attributes can increase as the amount of stored data items increases. In order to arrange for structured storage of data, attributes can be placed in a structure where some attributes are subordinate to other attributes.

For example, FIG. 1 is an example of the arrangement of a structure for attributes. In a table 10, a column 11 stores an attribute number for each attribute. Table 10 functions as an attribute logging segments. A column 12 stores an attribute name. A column 13 stores a relative attribute number, if applicable. The relative attribute number is used to indicate subordinate relationships In Table 10, the listed attributes have attribute numbers from 0001 through 0007. The attribute names listed in column 12 are the following: "Earth", "Asia", "America", "Taiwan", "Taichung", "History", and "Canada". respectively. Column 13 lists subordination relationships for the listed attributes. For example, the entry for Asia (Attribute Number 0002) includes a Relative Property Number 0001. This indicates (the continent of) Asia is subordinate to (e.g., part of) Earth (Relative Property Number 0001). The entry for America (Attribute Number 0003) includes a Relative Property Number 0001. This indicates (the continent of) America is subordinate to (e.g., part of) Earth (Relative Property Number 0001). The entry for Taiwan (Attribute Number 0004) includes a Relative Property Number 0002. This indicates (the country of) Taiwan is subordinate to (e.g., part of) Asia (Relative Property Number 0002). The entry for Taichung (Attribute Number 0005) includes a Relative Property Number 0004. This indicates (the city of) Taichung is subordinate to (e.g., part of) Taiwan (Relative Property Number 0004). The entry for Canada (Attribute Number 0003) includes a Relative Property Number 0003. This indicates (the country of) Canada is subordinate to (e.g., part of) America (Relative Property Number 0003).

There is no relevant attribute number listed for the attribute entry for "Earth" (Attribute Number 0001) and for the attribute entry "History" (Attribute Number 0006). This indicates that there is no other attribute available to which these attributes are subordinate.

When a user defines a new attribute, an attribute entry (also referred to as an attribute logging segment) is created in Table 10. Once the attribute entry is created, its "Attribute Name", "Attribute number" and "Relevant Attribute Number" are stored in within the attribute logging segment. The "Attribute Name" is entered by the user when the user defines the attribute. The "Attribute Number" is automatically generated by an attribute logging management unit. Each "Attribute Number" is unique. For example, Attribute Numbers are assigned in sequence so that an integer assigned to an Attribute Number for any particular entry will depend on the sequential order the Attribute entry was created.

When a new attribute is created, the user can select another attribute to which the new attribute is subordinate. Based on this selection, the attribute logging management will place the appropriate Relative Property Number into the new Attribute entry.

In order to store a data lot (e.g., a data file), a file logging segment is created which stores a "File Number", a storage "Location" and "Relative Attribute Number". The "File Number" is a unique identification number for the file.

The storage "Location" indicates the physical storage location of the data lot in memory. The storage location is typically identified by designating the disk unit, the route and the file name. The data lot (file) is individually stored by the disk unit using the route and filename.

For example, a Table 20 functions as a file logging segment, as shown in FIG. 2. In a column 21, the File Number is stored. In a column 22, the storage Location is set out. In a column 23, the Relative Attribute Number is stored.

When a file is stored, the user selects and/or creates one or more Attributes to be stored with the file. Within a table 20, shown in FIG. 2, the logging management unit creates one or more file logging segments for the file. One file logging segment entry is created for each attribute assigned to the file.

For example, as shown in FIG. 2, a file with file number A000025 (column 21) and storage location at C:\Document\Article.doc (column 22), has been assigned three attributes: "Taichung", "History" and "Canada". Thus three file logging segment entries are present in Table 20 for File Number A000025. The three file logging segment entries are identical except that each has a different relative attribute number. These are, respectively, relative attribute numbers 0006, 0005 and 0007.

Within FIG. 20, a file with file number A000030 (column 21) and storage location at D:\Person\Report.xls (column 22), has been assigned a single attribute: "Taiwan". Thus only a single file logging segment entry is present in Table 20 for File Number A000030. The file logging segment entry has the relative attribute number 0004 in column 23.

Also within FIG. 20, a file with file number A000035 (column 21) and storage location at E:\Readme.txt (column 22), has been assigned a single attribute: "Taichung". Thus only a single file logging segment entry is present in Table 20 for File Number A000035. The file logging segment has the relative attribute number 0005 in column 23.

When a lot of data (data file) is modified, it may be desirable for a user to add or subtract an attribute from the file. When the user deletes an attribute, the corresponding file logging segment entry is removed from Table 20. When the user adds an attribute, an additional entry is made to table 20.

This is illustrated by comparing FIG. 2 and FIG. 3. In FIG. 2, the file with File number A000030 stored at the location of D:\Person\Report.xls has only a single file logging segment entry and thus only relevant attribute number 0004 (for Taiwan) is stored for File number A000030.

FIG. 3 shows the changes made to Table 20 when a user has added another attribute (for example because the file has been modified) to the data file. In FIG. 3, an additional file logging segment has been added for the file with File number A000030 stored at the location of D:\Person\Report.xls. The user has determined that the attribute History now also describes the file with File number A000030 stored at the location of D:\Person\Report.xls. Thus the new file logging segment entry has been added for file number A000030 stored at the location of D:\Person\Report.xls which has the Relative Attribute number 0006 subordinating the file to the Attribute History.

When a user removes an attribute from a file, the associated file logging segment entry is removed from Table 20.

A user may sort the data in listed in Table 10 and Table 20 in several different ways. In a "Designation" step, the user designates an attribute. In an "Index Attribute" step, a search is made in Table 10 to find any listed attribute which matches the designated attribute. In an "Index Relevant Attribute" step, any relative property number from column 13, is searched to determine subordinate relationships of the accessed attribute.

In a "Index of File Relevant with Designated Attribute" step, a search is made in Table 20 for a data file with a designated attribute. In an "Index of File Correlated to Relevant Attribute of Designated Attribute" step, a search is made in Table 20 for any data file correlated to the relevant attribute of the designated attribute.

When a user wants to designate an attribute for a file, the user can traverse the contents of Table 10 for a relevant attribute. For example, FIG. 1 shows Table 10 to have seven attribute entries. If a user screens for attribute entries which do not have correlation (i.e., there is no relative attribute numbers for the attribute) the attribute for "Earth" and the attribute for "History" are located. Upon analyzing the attribute item of "Earth", it is found that there are two attributes subordinate to the "Earth": the attribute for "America" and the attribute for "Asia". A user can select either the attribute for "Asia" or the attribute for "America"; if the attribute for "Asia" is selected, there is only one attribute subordinate to the attribute for "Asia" that is the attribute for "Taiwan". The user can specify the attribute "Taiwan" as the designated attribute for the file. This method of selecting the option step by step promises fast search for the relevant attribute.

Alternatively, when a user wants to designate an attribute for a file, the user can traverse the attributes using an item-by-item comparison. For example, the user specifies the attribute name, and an attempt is made to match the name to an attribute name for an entry in Table 10. Such a search is trivial given the processing power of contemporary computers. The search is implemented, for example, by a full text search through Table 10 for a matching entry. Then the scope of index can be effectively narrowed down for fast pick up the data required in conjunction with each attribute item and judgment on its relevant attribute.

A user need only specify an attribute to easily locate a related file. For example, using Table 20 shown in FIG. 2, if the user specifies the attribute "Taichung", a search of Table 20 will produce two data files: the data files with the file numbers of A000025 and A000035. The file logging segments for the data files with the file numbers of A000025 and A000035 are shown in FIG. 4. Whereas the relevant attribute is the same for each of the two file logging segments (i.e., the relevant attribute number is 0005) both files can be quickly located by using the attribute as a search text.

Once a user has designated an attribute, the system takes over to use the attribute to locate associated files. If the user specifies attribute "America" (with attribute number of 0003), during the "Index Relevant Attribute" the system locates the attribute "Canada" (with relevant attribute number of 0003) can be picked up from file table 20. In the "Index and File Relevant with Relevant Attribute of Designated Attribute" step, the data file with relevant attribute number of 0007 can be located in the file logging segment, as illustrated by FIG. 5.

By following those steps described above, a data file with a specified attribute can be quickly and precisely located by the user while another data file related to the data file also can be picked up for the user to refer to.

Furthermore, logical operations between attributes, such as union or intersection, can increase the accuracy of a search. As the number of attributes specified by the user increases, the number of data files indexed by the intersection of the attributes becomes smaller and more accurate. For example, when searching for a data file with a topic involving the discussion of the status quo of foreign trade between Taiwan and Canada during the 90's, four attributes could be specified. For example, these could be "1990", "Taiwan", "Canada" and "Trade". In a hypothetical system, there may be, for example, twenty files with the "Taiwan" attribute and fifteen with the "Canada" attribute. Five files that have both the "Taiwan" and the "Canada" attribute may survive when a search is made for a file which has both attributes. When a third attribute "Trade" is added, this may reduce the number to only one or two which has all three attributes.

I claim:

1. A method for facilitating the access of data using user-defined attributes, comprising the following steps:
    (a) storing attributes in a first logging segment, entries for the attributes containing information which indicates subordinate relationships between attributes, the subordinate relationships creating an attribute structure;
    (b) when a user stores a data lot, allowing the user to specify one or more attributes to be linked to the data lot; and,
    (c) storing in a second logging segment, entries which show links from data lots to attributes, each entry in the second logging segment includes a file number, a file location and a relative attribute number, wherein the relative attribute number specifies an associated attribute.

2. A database system comprising:
    a first logging segment for storing attributes, each entry in the logging segment storing an attribute and optionally storing information which indicates a subordinate relationship to another attribute, so that subordinate relationships specified in entries within the first logging segment indicates an attribute structure; and,
    second logging segment for storing file references, each entry in the logging segment specifying a data lot and an attribute designated for the data lot, when more than one attribute is designated for a single data lot, there are multiple entries for the single data lot within the second logging segment, each of the multiple entries specifying the data lot and a different attribute.

3. A database system comprising:
    a first logging segment for storing attributes, each entry in the logging segment storing an attribute and optionally storing information which indicates a subordinate relationship to another attribute, so that subordinate relationships specified in entries within the first logging segment indicates an attribute structure; and,
    second logging segment for storing file references, each entry in the logging segment specifying a data lot and an attribute designated for the data lot, wherein each entry in the second logging segment includes a file number, a file location and a relative attribute number, wherein the relative attribute number specifies an attribute.

* * * * *